United States Patent [19]

Newhall

[11] Patent Number: 5,012,934
[45] Date of Patent: May 7, 1991

[54] DRAINER FOR DRYING AND STORING KITCHEN AND OTHER UTENSILS

[76] Inventor: Robert J. Newhall, 968 Tulare, Albany, Calif. 94707

[21] Appl. No.: 583,447

[22] Filed: Sep. 17, 1990

[51] Int. Cl.$^5$ .................................................. A47F 7/00
[52] U.S. Cl. ...................................... 211/41; D32/55; D32/56
[58] Field of Search ................... 211/41, 40; D32/55, D32/56

[56] References Cited

U.S. PATENT DOCUMENTS

| | | | |
|---|---|---|---|
| D. 192,477 | 3/1962 | Chapman | 211/41 |
| D. 268,878 | 5/1983 | Taylor | D32/55 |
| 415,634 | 11/1889 | Guptill | 211/41 |
| 804,481 | 11/1905 | Lawrence | 211/41 |
| 4,221,299 | 9/1980 | Taylor | 211/41 |
| 4,531,641 | 7/1985 | Archambault | 211/41 |
| 4,592,471 | 6/1986 | Bross | 211/41 |

*Primary Examiner*—Robert W. Gibson, Jr.
*Attorney, Agent, or Firm*—David Pressman

[57] ABSTRACT

A drainer for drying kitchen and other utensils has two spaced supports (10, 11), and a horizontally extending shelf (12) for supporting kitchen utensils to be dried. The shelf has longitudinal grooves (36, 38) in its top surface (24) to collect water dripping from kitchen utensils. The top surface (24) of the shelf (12) slopes downwardly lengthwise between a point (A) located intermediate the ends of the shelf (12) and its ends. The longitudinal grooves (36, 38) terminate over a pair of troughs (48, 50) which are provided adjacent to, and below each respective line (L) of intersection of the opposite ends of the shelf (12) and a respective pair of partition walls (66L, 66R). The troughs (48, 50) have downwardly inclined bottoms (52, 54) for channeling water to sink. A pair of slits (44, 45) are adjacent the opposite ends of the shelf and the partition walls to establish communication of the top surface (24) of the shelf with the troughs (48, 50), whereby water is steadily and smoothly removed from the shelf without splashing. The drainer is placed over and straddles the rear of the sink (20) and the faucet (90) so as to leave the faucet and space above the sink free.

20 Claims, 5 Drawing Sheets

DRAINER FOR DRYING AND STORING KITCHEN AND OTHER UTENSILS

BACKGROUND—FIELD OF THE INVENTION

The present invention relates to drainers, particularly to a drainer for draining, drying, and storing kitchen, medical, and laboratory utensils.

BACKGROUND—DESCRIPTION OF PRIOR ART

One method of drying various utensils (e.g. kitchen utensils such as dishes, flatware, etc., as well as medical and laboratory utensils) is to allow the rinse water to drain while simultaneously air drying the utensils. In other words, the utensils are placed in a substantially upright position so that excess water can drip due to gravity while the rest of the water evaporates. Various drainers are known in the art which are designed for drying kitchen utensils using this method.

One such drainer is described in Sonnemann U.S. Pat. No. 1,037,073, 1912. This device is, in fact, a combination dishwasher and drainer and comprises a casing having a plurality of inclined foraminous shelves for receiving kitchen utensils, a water sprayer at the top of the casing, and means for collecting dripping water in an inclined bottom of the casing. This device is attached to a wall over a sink and water drips from the bottom part of the casing into the sink by gravity. This device is deficient in that dishes must be placed in an inclined position, rather than in an upright position, so that dripping is rather slow, and the available dish-holding space is rather small. Also water drips from utensils placed on the upper shelf onto utensils on the shelf located below, which also makes the draining process slower. Moreover, this arrangement increases the height of the drainer so that the wall space above the sink cannot be used for other utility items. The device is complicated to manufacture, and casings of different sizes are required to fit sinks of various width. Another disadvantage is that collected water is removed via an inclined pipe which is located high above the sink which may result in splashing and spilling.

In another device, described in Wood British patent 542,912, 1894, several horizontally extending shelves provided above one another are attached to two vertical stanchions. The shelves are trough-shaped and have means for supporting dishes in an upright position. Water dripping from dishes is collected in the trough-like shelves which are made removable for draining water from the shelves after dish drying. Cups, glasses, and silverware are placed in special locations for drying. Apart from the need to remove shelves for draining water, this drainer is deficient in that it has a complicated design and takes much vertical space. In addition, water dripping from silverware is collected in a separate tray which also has to be emptied. Another disadvantage resides in the fact that water can be inadvertently left in the shelves; this is conducive to the growth of mold and bad sanitary conditions.

A very simple device in the form of a rack for pots and pans is disclosed in Pelletier U.S. Pat. No. 2,969,194 et al., 1959. The rack consists of a pair of spaced hangers which are interconnected by means of crossbars and suspension means. This rack can be used only for a limited range of kitchen utensils. Water drips from kitchen utensils directly into a sink without being collected; therefore it tends to splash. In addition, this device must be suspended from top, which is not always convenient or possible. Furthermore, the installation may present problems.

Another drying rack for dishes and silverware, disclosed in Migues U.S. Pat. No. 2,936,898, 1957, has a bottom plate for supporting dishes and other tableware items in a substantially upright position and a utility compartment for receiving silverware. The bottom plate is inclined and communicates with a box for collecting water. The box with water is removable for emptying it after drying the kitchen utensils. This device is deficient in that it is necessary to remove and reinstall the box. The device is also complicated so that its manufacture is impractical. Another disadvantage is that the device calls for a large kitchen counter area.

An upright dish draining device, shown in Heien U.S. Pat. No. 4,75,582, 1986, is in the form of an upright support for dishes combined with a utility compartment for silverware. The support has a trough for collecting dripping water and a pipe for draining water from the trough into a sink. The device must be suspended from a wall and partly occupies the useful space of the kitchen counter. The device has limited capacity, especially as far as cups and glasses are concerned, because the latter can only be put on inclined prongs disposed in a single row. The capacity of the device can be increased only by making it longer or deeper. However, both ways result in less counter space. In addition, dripping water is removed through a pipe. This requires that the device have a large angle of inclination, resulting in water flowing in the form of a rather strong jet. Otherwise, a dead zone will be formed. Moreover, this device requires a customized installation.

OBJECTS OF THE INVENTION

It is accordingly an object of the present invention to eliminate disadvantages of prior art drainers.

Another object is to provide a drainer for drying and storing kitchen, laboratory, and other utensils which can be placed on a kitchen or other counter in such a manner as to occupy a space which is currently in little use. This object can be accomplished without occupying the useful space of the counter traditionally used for drainers, so that the space can be used for food preparation or other work.

Other objects are to provide a simple structure which ensures automatic, steady, and smooth return of dripping water to the sink; to provide a drainer for utensils in which the means for collecting dripping water has a simple structure and configuration and allows water to be collected and removed continuously, in a smooth and splash-free manner; to provide a drainer which is adapted for bridging a sink; to provide a drainer which can be easily manufactured to fit different sink sizes; to provide a drainer for utensils in which water drips and flows with minimum splashing; and to provide a drainer for utensils which remains stable in both loaded and unloaded state.

Further objects and advantages will become apparent from the following description with reference to the accompanying drawings.

Figure 1:
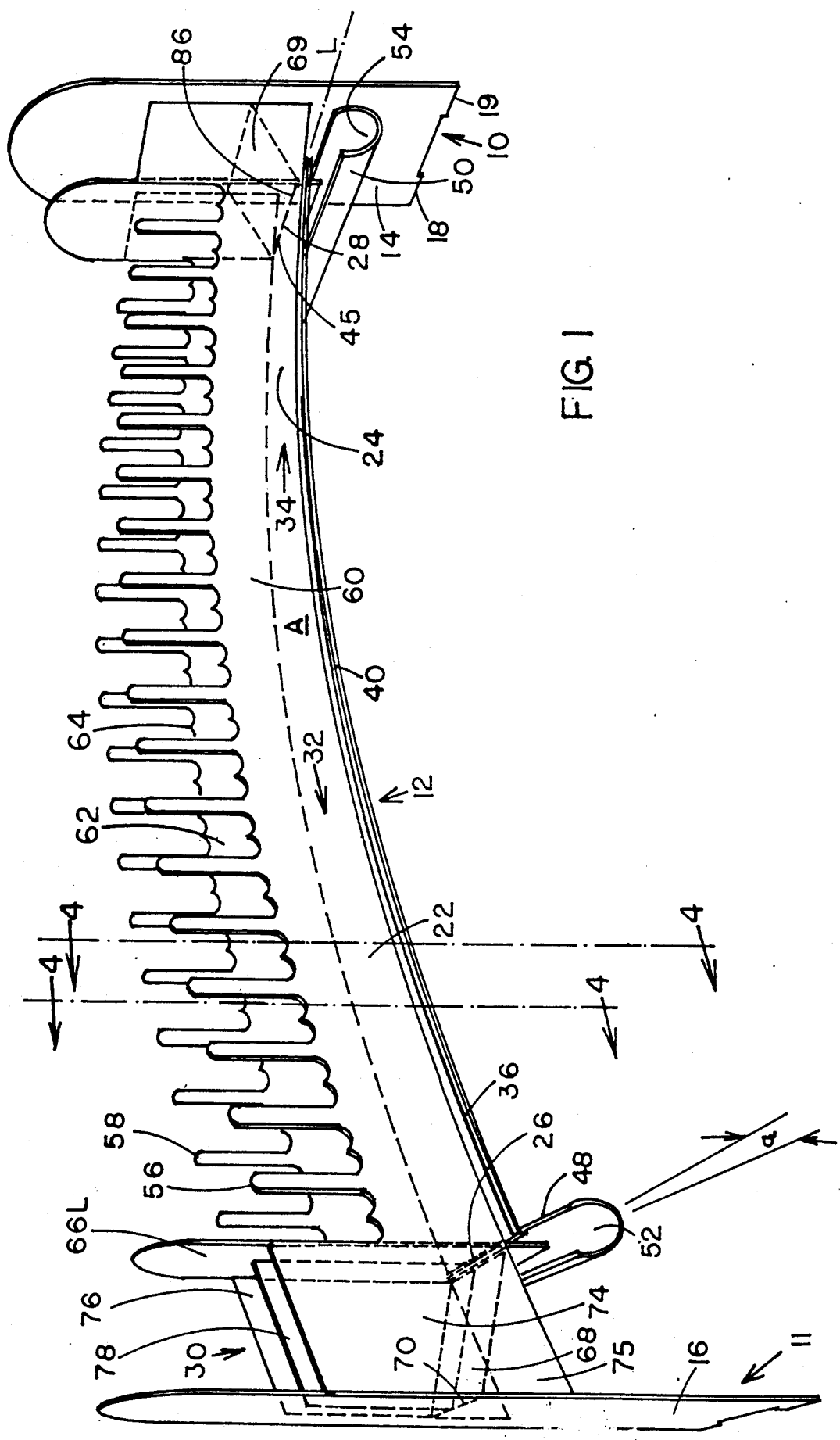
FIG. 1 is a schematic general perspective view of a drainer for drying kitchen utensils according to the invention.

REFERENCE NUMERALS USED IN THE DESCRIPTION AND DRAWINGS 10,11—supports
12—shelf
14, 16—vertically extending stanchions
18, 19—legs
20—sink
22—plate
24—top surface of plate 22
26, 28—ends of plate 22
30, 31—small utensil/silverware compartments
32, 34—arrows
36, 38—grooves
40, 42—longitudinal edges of plate 22
44, 45—slits at ends of shelf 12
48, 50—troughs
52, 54—trough bottoms
56, 58, 59, 59'—prongs
60, 62—walls
64—projection of walls 60, 62
66R, 66L—partition wall
68, 69—bottom floors
70, 72—ends of bottom floor 68
74, 76—side walls
75, 77—lower portion of side wall 74, 76
78—middle wall
82, 82'—screws
83—threaded hole
84, 86—slits at ends of floors 68, 69
88—kitchen counter
90—tap
C—cup
L—line of intersection
Á—angle of inclination of bottoms 52, 54
A—angle of inclination of prong 59

FIGS. 1-5—Detailed Description of the Drainer of the Invention

Figure 2:
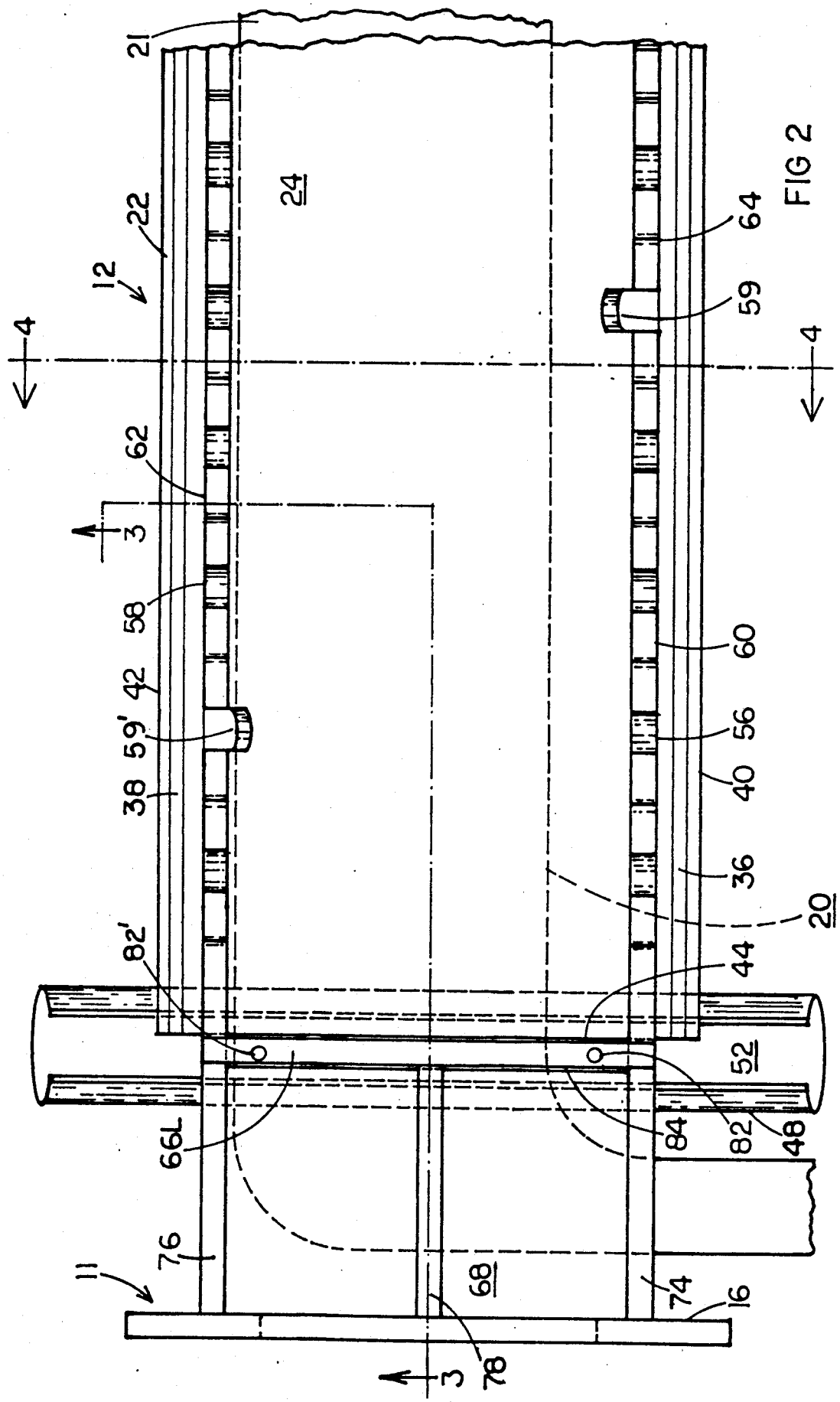
FIG. 2 is an enlarged partial plan view of the drainer of FIG. 1 illustrated as installed over a sink (shown partly in broken lines).

FIGS. 1 and 2 show a drainer for kitchen, laboratory, or other utensils in accordance with the invention. The drainer has a pair of spaced end supports 10 and 11 and a bridging shelf 12 for supporting the utensils. In the embodiment shown, supports 10 and 11 are in the form of vertically extending stanchions 14 and 16. Stanchion 14 has legs 18 and 19 at its bottom. Stanchion 16 has similar legs. The legs impart a better stability to the drainer when the kitchen counter is somewhat uneven. However, the supports may be in the form of short plates having holes or hooks for affixing them to a wall (not shown). The distance between supports 10 and 11 (or stanchions 14 and 16) is somewhat greater than the width of a normal sink so that when the drainer is installed on a kitchen counter (FIG. 5), stanchions 14 and 16 straddle the sink, i.e., they rest on the outside edges, as shown with a sink 20 (FIG. 2).

Shelf 12 is in the form of a substantially horizontally extending plate 22 having a top surface 24 and opposite ends 26 and 28. Left end 26 terminates adjacent a partition wall 66L (left) and right end 28 adjacent a similar partition wall 66R. A silverware compartment, generally shown at 30, is positioned between and formed by partition wall 66L and stanchion 16, and a similar compartment 31 is provided at the right end. Right end 28 may be attached directly to stanchion 16 in the same manner as end 26 is attached to stanchion 14 if compartment 30 is not needed. Shelf 12 and stanchions 14 and 16 form a self-supporting, load-bearing structure which can be mounted on a kitchen counter to bridge sink 20.

As can be seen in FIG. 1, plate 22 is arched; its top surface slopes down on both sides of a center point A located intermediate ends 26 and 28, as shown by arrows 32 and 34. This construction imparts good stability and rigidity to the drainer. Plate 22 may be made sloping in other ways. For example, it may be made out of two flat plates angularly connected to each other at point A to provide an anticline or upwardly facing ridge (not shown). In any case, water will flow along top surface 24 in opposite directions, as shown by arrows 32 and 34.

Figure 4:
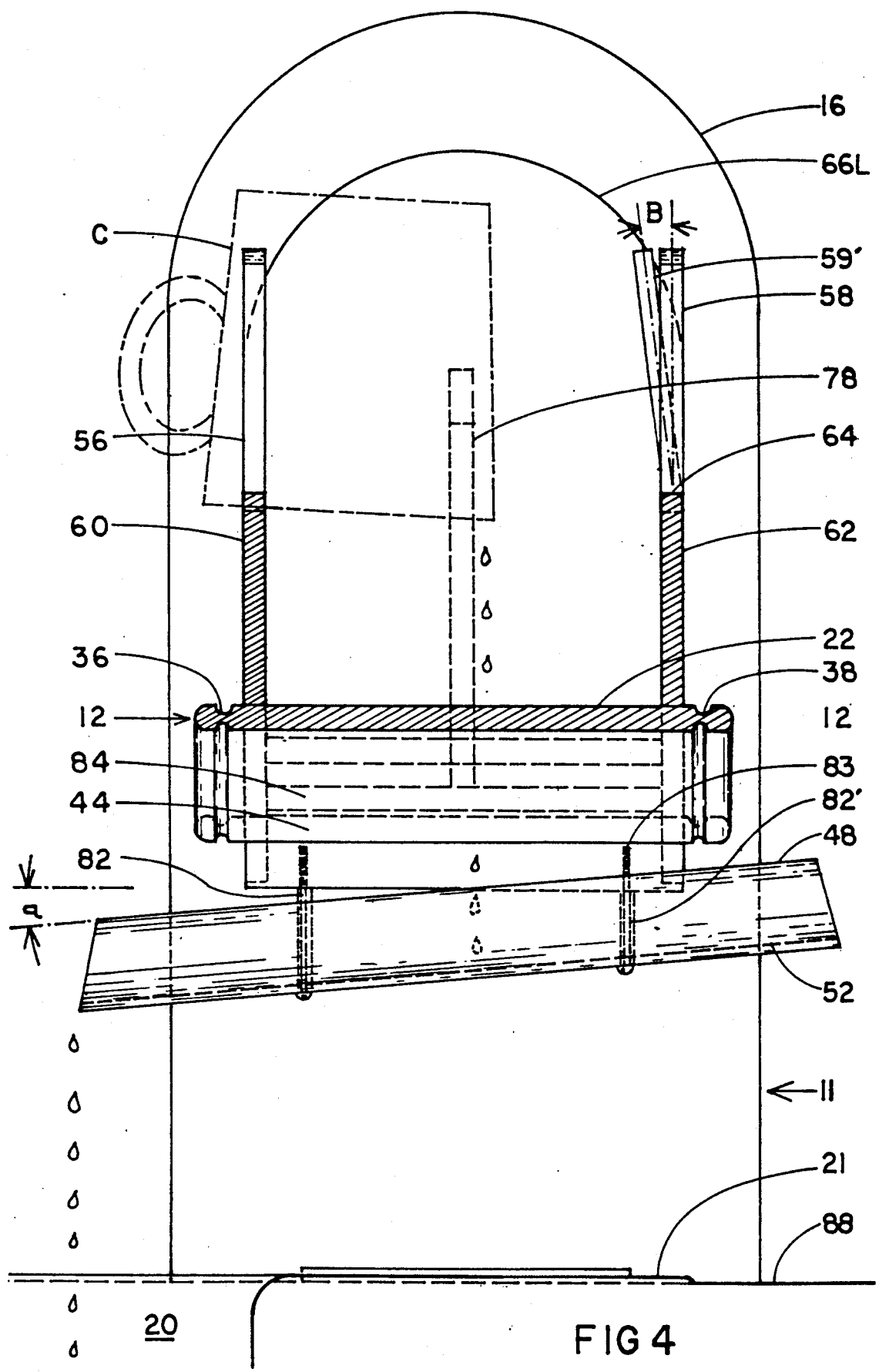
FIG. 4 is a sectional view taken along line 4—4 in FIG. 2.

Grooves 36 and 38 (FIG. 2) are made in the top surface 24 of shelf 12, in parallel with longitudinal edges 40 and 42, respectively (FIGS. 1, 2 and 4). As shown in FIG. 4, grooves 36 and 38 are of a half-circular cross-sectional configuration, but they may be triangular, parabolic, or the like in cross-section. The cross-sectional configuration of grooves 36 and 38 mainly depends on how they are made. The grooves may be eliminated if longitudinal edges 40 and 42 are extended upward to form a gutter (not shown). The main purpose of grooves 36 and 38 is to capture water dripping from utensils onto top surface 24 so as to prevent spillage over longitudinal edges 40 and 42.

Figure 3:
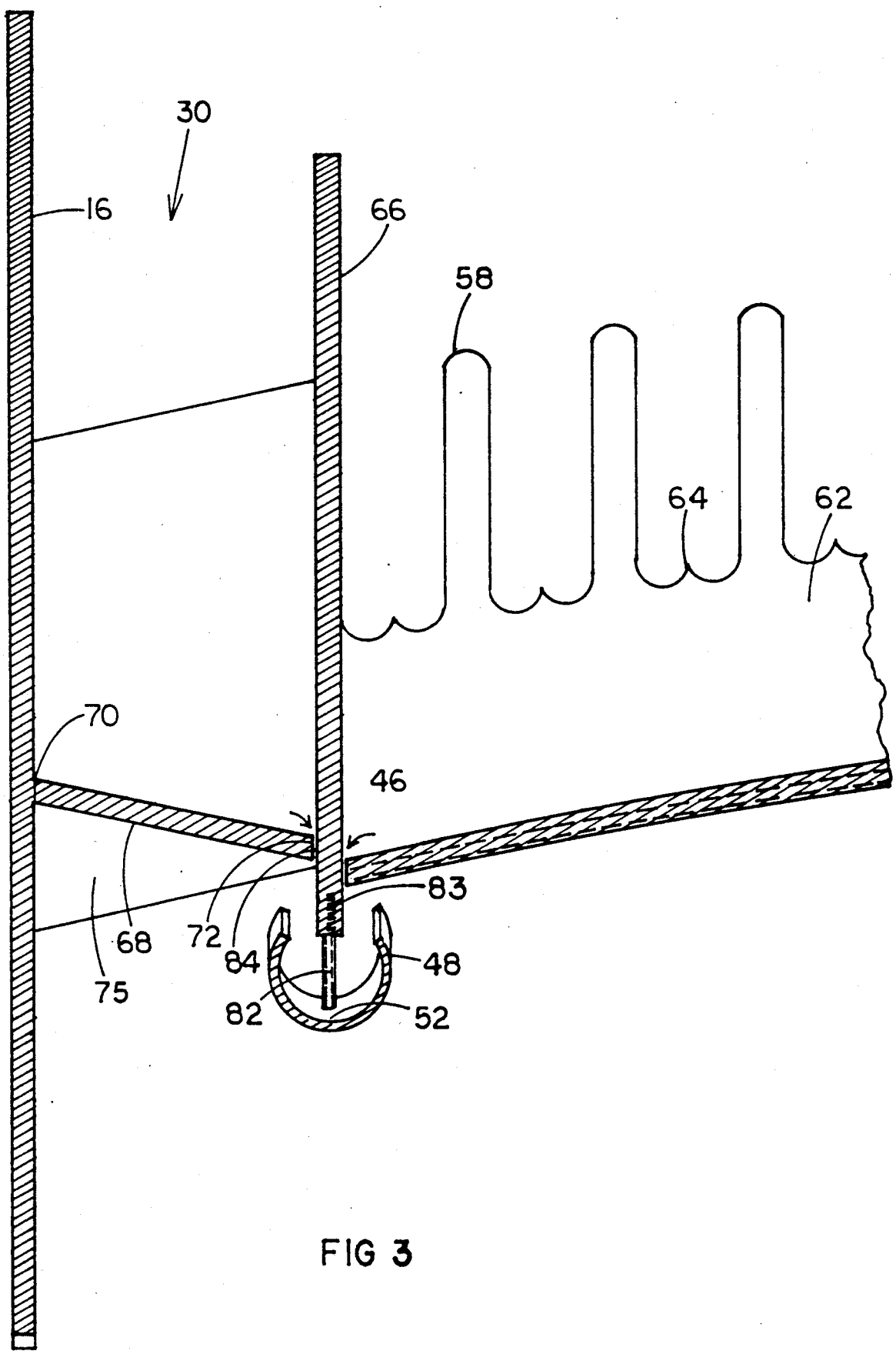
FIG. 3 is a sectional view taken along line 3—3 in FIG. 2.

Shelf 12 adjoins partition wall at slit 44 (FIG. 3). A similar slit 84 is formed by floor 68 of compartment 30 with partition 66. Similar slits are formed on the right side of the drainer. The width of each of these slits preferably ranges from 0.5 mm to 2.0 mm. This construction and the width of the slits is most preferred so as to ensure a smooth flow of dripping water through the slits without splashes. It is inexpedient to have a slit smaller than 0.5 mm in width as it can bring about clogging. With slits wider than 2.0 mm, water dripping into troughs to be described below can result in splashing. It is understood that different means, such as fine nets, holes, or perforations, may also be used to achieve this result.

With reference to FIGS. 1 and 2, for removing dripping water a pair of troughs 48 and 50 are provided adjacent to, and below lines L and slits 44 and 45. As can be seen in FIGS. 2 and 3, grooves 36 and 38 terminate over troughs 48 and 50. Troughs 48 and 50 have bottoms 52 and 54, respectively. The manner of attachment of troughs 48 and 50 to the drainer will be described below. Irrespective of the manner in which the troughs are attached to the drainer, bottoms 52 and 54 of trough 48 and 50 are inclined downwardly, as schematically shown by angle Á in FIG. 1. This angle should be great enough, e.g., 7½° to the horizontal, to ensure that water will drain by force of gravity, but it should not be substantially greater than this.

Utensils are supported on shelf 12 by means of at least two substantially parallel rows of spaced opposed prongs 56 and 58 on top surface 24. Prongs 56 and 58 run between grooves 36 and 38 (FIG. 4). Prongs 56 and 58 protrude upwardly from top surface 24 of shelf 12. In the embodiment shown here, prongs 56 and 58 are made integral with vertically protruding parallel walls 60 and 62 which are attached to, or made integral with, shelf 12. Short projections 64 of walls 60 and 62 are formed in recesses between adjacent prongs 56 and 58.

Figure 5:
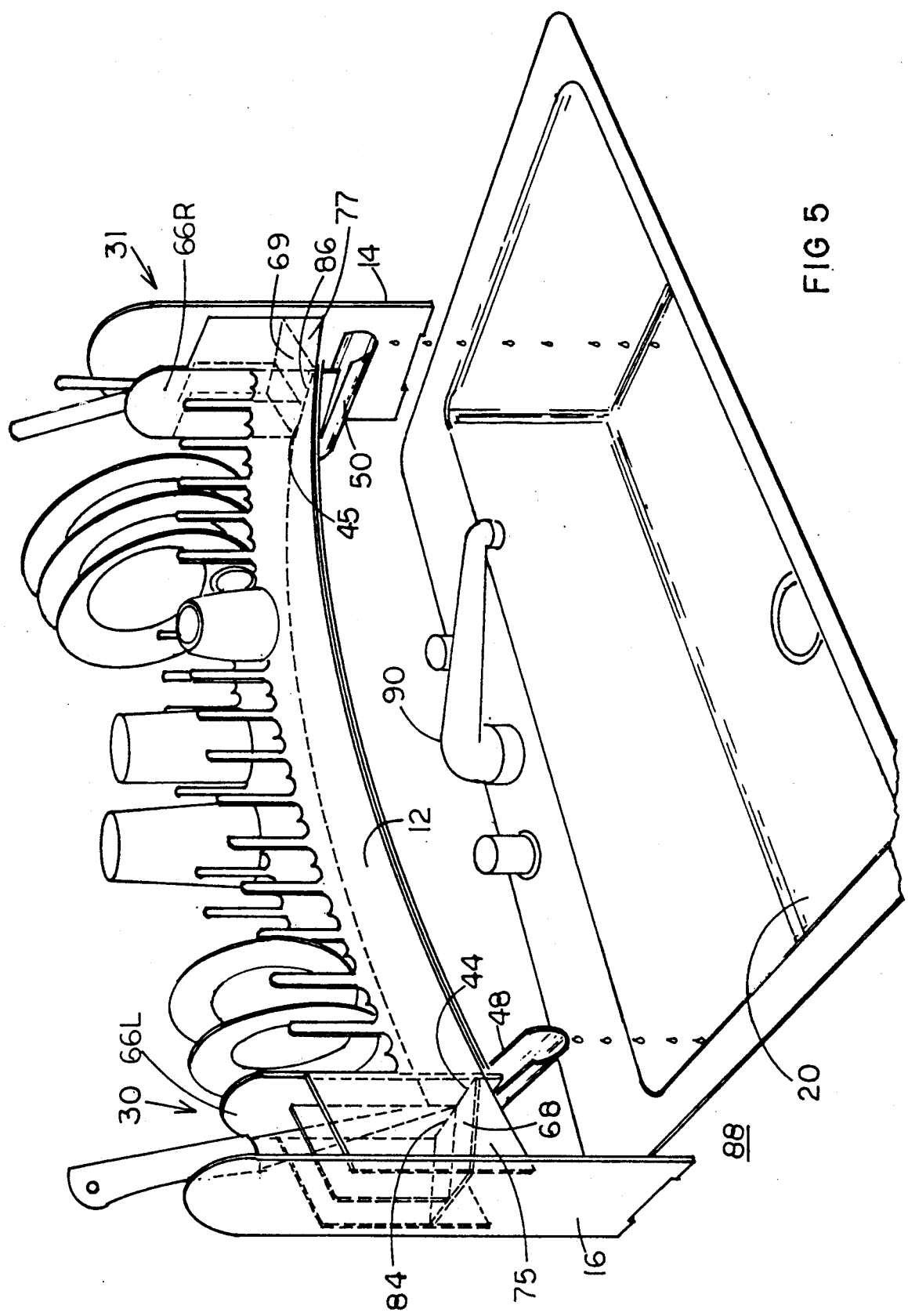
FIG. 5 is a perspective view showing the drainer drying kitchen utensils according to the invention.

With this construction, utensils, such as dishes, tableware, or laboratory equipment items, rest on shelf 12 as follows. Their bottoms will rest in the recesses between projections 64 and against them, and an intermediate part of each dish/utensil will be supported by opposed prongs 56 and 58, as can be seen in FIG. 5. Prongs 56 and 58 can also support cups, glasses, and like items in an upside-down position.

For better drainage of water from cups and glasses, some prongs, e.g., prongs 59 and 59' in FIG. 4 may be inclined inwardly from the vertical. Prongs 59 and 59' are inclined at an angle B of up to 10°. This inclined position allows cups, glasses, and like utensils to be inclined in such a manner (see a cup C shown in phantom lines in FIG. 4) that water can drip mainly into the space between the rows of prongs 56 and 58 rather than into grooves 36 and 38.

Compartment 30 (FIG. 3) can be provided for drying silverware and utensils in a known manner. Compartment 30 is formed by vertically extending partition wall 66 (FIGS. 1 and 3). Bottom floor 68 has one end 70 attached to stanchion 16, e.g., by welding, plastic adhesive, solvent bonding, mechanical fasteners, etc., and another end 72 which terminates in slit 84, adjacent wall 66. A pair of substantially vertically extending side walls 74 and 76 (FIG. 1) are perpendicular and are attached to partition wall 66 and floor wall 68. Walls 74 and 76 preferably are integral with walls 60 and 66, respectively. Bottom floor 68 extends in a downwardly inclined position with respect to stanchion 16, as can be seen in FIG. 3. Compartment 30 may also have a middle wall 78 (FIG. 1) which divides the compartment to facilitate its use and to reinforce the connection between stanchion 16 and wall 66.

As shown in FIGS. 3 and 4, trough 48 is attached to threaded holes, such as 83, in partition wall 66 by means of a pair of screws 82 and 82'. The bottom of trough 48 may be inclined as shown if screw 82' is driven deeper than screw 82. If no utensil compartment is provided, partition wall 66 can be shortened or eliminated.

Water dripping from silverware items placed in compartment 30 can flow down into trough 48 through slits 84.

FIG. 5 shows the drainer loaded with kitchen utensils. This drainer can simply be placed on a kitchen, laboratory, or other counter 88 so that its stanchions 14 and 16 are supported outside the rim of sink 20. Stanchions 14 and 16 are made high enough (about 18 cm from their feet to the line of attachment of floor 68 of compartment 30) with all of their dimensions arranged proportionally so that the user can manipulate a tap 90. Center point A can vary in height as necessary to accommodate a variety of faucet types. Dishes, glasses, and cups are placed on prongs 56, 58, and 59 and projections 64 of shelf 12. Silverware is placed in utility compartments 30 and 31. Rinse water drips from the utensils and flows down along shelf 12 and bottom walls 68 and 69 through slits 44, 45, 84 and 86 of the shelf and floors, respectively, into troughs 48 and 50. Thereafter it drips into sink 20, as indicated. Grooves 36 and 38 capture water that can tend to spread towards edges 40 of plate 22, thus preventing spilling and splashing.

SUMMARY, RAMIFICATIONS AND SCOPE

It will be apparent from the foregoing description that the drainer according to the invention is simple in construction and takes small space as it can be used in the zone above and at the rear of the sink and above the faucet, which is not currently in use. At the same time, the means for channelling dripping water are so arranged and constructed as to take minimum space possible and to provide for a smooth flow of water into the sink.

Those skilled in the art can use various alternative materials, such as plastic, metal, or even wood, various manufacturing methods, including bending, molding, casting, welding, and gluing. Such methods and materials may largely vary and depend on manufacturing facilities available.

Drainers of the type described herein can also be used for draining and supporting kitchen and other item utensils, such as laboratory glassware, medical appliances, sports equipment, food processing equipment, etc.

It will also be apparent to those skilled in the art that it is very easy to make drainers of the type described herein to bridge sinks of different width. One size shelf can be used between stanchions, bearing in mind that single, double, and like sinks have standard modular dimensions. This greatly facilitates manufacture and minimizes expenses.

Although grooves 36 and 38 were shown in specific shapes and profiles, it is understood that these shapes and profiles were shown only as examples and that they may have any other configuration suitable for efficient containment and drainage of water.

Accordingly the full scope of the invention should be determined by the appended claims and the legal equivalents, and not by the examples given.

What we claim is:

1. A drainer for drying utensils, said drainer comprising:
    at least two spaced supports;
    at least one substantially horizontally extending shelf having means for supporting utensils above said shelf to be dried, a pair of opposite ends, a top surface, and a pair of opposite longitudinal edges;
    said top surface of the shelf sloping downwardly lengthwise between a point located intermediate said ends of the shelf and said ends thereof; and
    means for channelling water dripping from said utensils above said shelf onto said top surface of said shelf to a place of disposal.

2. The drainer for drying utensils of claim 1 wherein said means for channelling water comprises:
    a pair of troughs, each provided below said opposite ends of said shelf, each trough having a downwardly inclined bottom; and
    means for establishing communication between said top surface of said shelf and said troughs.

3. The drainer of claim 1 wherein said supports comprise a pair of vertically extending stanchions.

4. The drainer of claim 2 wherein said means for channelling water comprises a partition adjacent at least one of said ends of said shelf, said partition being spaced from said end of said shelf to form a slit.

5. The drainer of claim 3 wherein said shelf has a pair of longitudinal grooves adjacent the edges thereof.

6. The drainer of claim 1 wherein said means for supporting utensils to be dried above said shelf comprises at least two substantially parallel rows of spaced opposed prongs on said top surface of said shelf, said prongs protruding upwardly from said top surface of said shelf.

7. The drainer of claim 1 wherein said shelf has at least one groove adjacent an edge thereof.

8. The drainer of claim 4 wherein said slit has a width between 0.5 mm and 2.0 mm.

9. The drainer of claim 8 wherein said shelf has at least one groove adjacent an edge thereof, an end of said groove overlying said slit and one of said troughs.

10. The drainer of claim 6 wherein at least some of said prongs are inclined at an angle ranging from 0° to 10° to the vertical.

11. The drainer of claim 1, further including a silver or utensil compartment adjacent one or both of said supports and above said shelf.

12. A drainer for drying utensils, said drainer comprising:
   at least two spaced supports;
   at least one substantially horizontally extending shelf having means for supporting kitchen utensils to be dried, a pair of opposite ends, a top surface, and a pair of opposite longitudinal edges;
   at least one vertically extending partition wall;
   at least one bottom floor, said bottom floor extending between said support and said vertically extending partition wall;
   a pair of substantially vertically extending side walls extending perpendicularly with respect to, and attached to said vertically extending partition walls and said bottom floor, whereby at least one compartment for utensils is formed;
   said bottom floor extending in a downwardly inclined position with respect to one of said support;
   one end of said shelf being attached adjacent another one of said supports and the other end of said shelf terminating adjacent said vertically extending partition wall;
   said top surface of said shelf sloping downwardly lengthwise between a point located intermediate said ends of the shelf and said ends thereof; and
   means for channelling water dripping from kitchen utensils from said top surface of said shelf to a place of disposal.

13. The drainer of claim 12 wherein said supports comprise a pair of vertically extending stanchions.

14. The drainer of claim 13 wherein said means for channelling water comprises a pair of troughs, each provided below a respective opposite end of said shelf, each trough having a downwardly inclined bottom, and means for establishing communication between said top surface of said shelf with said troughs, said means for establishing communication comprising a pair of partitions at opposite ends, respectively, of said shelf, each partition being spaced from its end of said shelf to form a slit.

15. The drainer of claim 12 wherein said shelf has a pair of longitudinal grooves adjacent the edges thereof.

16. The drainer of claim 12 wherein said means for supporting utensils to be dried above said shelf comprises at least two substantially parallel rows of spaced opposed prongs on said top surface of said shelf, said prongs protruding upwardly from said top surface of said shelf.

17. The drainer of claim 12 wherein said shelf has at least one groove adjacent an edge thereof.

18. The drainer of claim 14 wherein said slits have a width between 0.5 mm and 2.0 mm.

19. A drainer for drying utensils, said drainer comprising:
   a pair of vertically extending stanchions;
   at least one substantially horizontally extending shelf having means for supporting utensils to be dried, a pair of opposite ends, a top surface, and a pair of opposite longitudinal edges;
   at least one vertically extending partition wall;
   at least one bottom floor, said bottom floor extending between one of said stanchions and said vertically extending partition wall;
   a pair of substantially vertically extending side walls extending perpendicularly with respect to, and attached to said vertically extending partition wall and said bottom floor, whereby at least one compartment for utensils is formed;
   said bottom wall extending in a downwardly inclined position with respect to said vertically extending stanchion;
   one end of said shelf terminating adjacent another one of said stanchions and the other end of said shelf terminating adjacent said vertically extending partition wall;
   said top surface of said shelf sloping downwardly lengthwise between a point located intermediate said ends of the shelf and said ends thereof;
   at least two grooves in said top surface of the shelf, each extending along said longitudinal edge of said shelf and terminating adjacent said ends of said shelf;
   at least a pair of troughs, each provided adjacent to, and below said opposite ends of said shelf, each trough having a downwardly inclined bottom;
   means for establishing communication of said grooves and said top surface of said shelf with said troughs;
   at least two substantially parallel rows of spaced opposed prongs on said top surface of said shelf and running between said grooves, said prongs protruding upwardly from said top surface of the shelf, at least a part of each of said prongs being in an inwardly inclined position in a vertical plane drawn through said opposed prongs.

20. The drainer of claim 19 wherein said means for establishing communication comprises at least one slit between an end of said shelf and said vertically extending partition wall.

* * * * *